Dec. 18, 1928.
S. QUISLING
VEHICLE BRAKE
Filed June 6, 1924
1,695,901
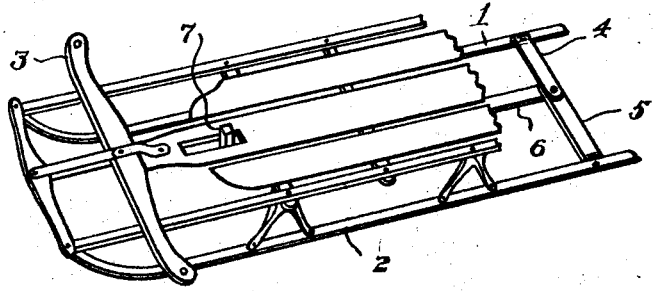
Fig. 1.
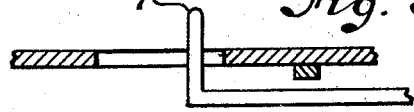
Fig. 3.
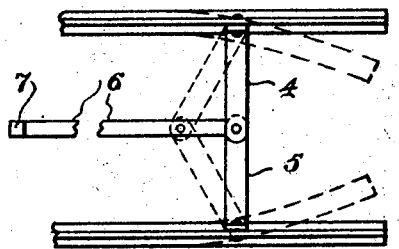
Fig. 2.
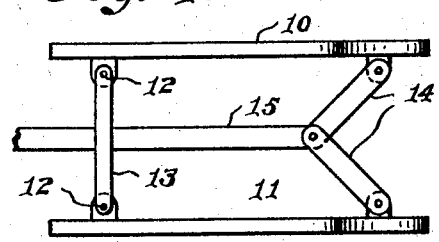
Fig. 4.
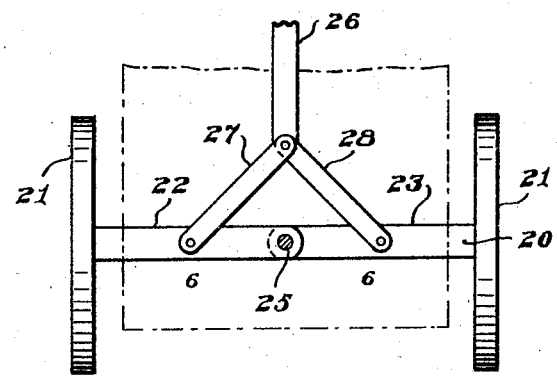
Fig. 6.
Fig. 5.
Sverre Quisling.
INVENTOR
BY Victor J. Evans
ATTORNEY
WITNESS:

Patented Dec. 18, 1928.

1,695,901

UNITED STATES PATENT OFFICE.

SVERRE QUISLING, OF PHILADELPHIA, PENNSYLVANIA.

VEHICLE BRAKE.

Application filed June 6, 1924. Serial No. 718,361.

This invention relates to brakes for various types of vehicles, and an object of the invention is to provide a brake structure which is relatively simple in construction, easy to operate and which provides a braking action from the friction created by the moving road engaging vehicle supports or portions thereof to a plane transversely of the direction of travel of the vehicle.

More specifically, the invention comprehends the projection of a brake structure embodying means for angulating the relative directions of opposite, otherwise parallel sled runners or vehicle wheels by flexing or moving the respective cross bars or axles, and thus, when the runners or wheels are moved transversely to the direction of travel of the vehicle, and to each other, they will cause a friction by their substantially broad-side engagement with the road surface, and thus impede locomotion, and brake the travel of the vehicle, and in cases of wheeled vehicles, the movement of the wheels transversely to the travel of the vehicle, will also greatly retard rolling or rotation of the wheels, resulting in the braking action.

Other objects of the invention will appear in the following detail description, and in the accompanying drawings wherein:—

Figure 1—is a perspective view of a sled constructed in accordance with this invention.

Figure 2—is a detail plan view of the rear parts of the sled runners, showing the rear ends of the runners in normal positions in full lines, and in moved positions in dotted lines.

Figure 3—is a detail view of the part 7 as operating in a slot formed in the top of the sled.

Figure 4—is a top plan of the runner and brake structure, as applicable to what is commercially known as a bob-sled.

Figure 5—is a top plan of the brake device as applied to a portion of a wheeled vehicle.

Figure 6—is a detail sectional view of the connections between the parts 22 and 23.

Referring more particularly to the drawings, Figures 1 to 3 inclusive, illustrate a sled of approved type, such as is used for coasting or the like, and it includes the runners 1 and 2, which are preferably constructed of steel or similar material, which is semi-flexible and in the drawing, the sled is of the type which includes the cross bar 3 connected to the front end of the runners 1 and 2, to permit steering of the sled. The rear ends of the runners 1 and 2 are connected one to the other, by bars 4 and 5, which bars are in turn pivotally connected at the longitudinal center of the sled to each other, and to the operating rod 6. The operating rod 6 extends longitudinally of the sled towards the front end thereof and has an upstanding end 7 which may be engaged by the hand or foot of the user of the sled for forcing the rod 6 forwardly, as indicated in dotted lines in Figure 2 of the drawings, which forward movement of the rod 6, will move the rear ends of the runners 1 and 2, inwardly, and transversely to the direction of travel of the sled, causing a sidewise engagement of the runners with the surface over which the sled is traveling and create a brake action which will retard the speed of the sled.

In Figure 4 of the drawings, the same principle is illustrated, as applicable to the sled runners of what is commercially known as a "bob-sled", wherein front and rear sets of runners are provided. However, only the rear runners are illustrated in the drawing. The runners 10 and 11 are hinged as shown at 12, at their front ends, to a cross bar 13, and the hinged joints 12 are preferably of the conventional type which permits the runners to swing only in one direction. The rear ends of the runners 10 and 11 have arms 14 connected thereto which are in turn pivotally connected to each other, and to the longitudinally movable operating bar 15, which is similar to and functions the same as the operating bar 6 in that when it is moved forwardly, it will pivot the runners 10 and 11 on their hinges 12 and swing them towards each other at acute angles to the direction of travel of the sled equipped with the runners.

Figures 5 and 6 of the drawings, illustrate the application of the braking system to a wheeled type of vehicle, and in these drawings only the rear axle structure 20 and the wheels 21 of the vehicle are shown, being considered unnecessary to illustrate further details of the chassis or running gear structures of the vehicle.

The axle 20 is composed of sections 22 and 23 which are connected intermediate their ends, by means of interengaging tongue and groove connections 24 and the pivot pin 25. The brake control or operating bar 26 is pivotally connected to arms 27 and 28, which are in turn, connected to the sections 22 and 23, one to each respective section, intermediate the pivotal connection of the sections and the wheels 21 carried thereby. When the bar 26 is moved forwardly, it will move the axle sections 22 and 23 upon their pivots, which will in turn move the wheels 21 transversely to the direction of travel of the vehicle, thereby retarding the rotation of the wheels, providing sidewise engagement with the road surface and creating sufficient friction to cause a braking action upon the vehicle. This construction of brake mechanism for wheeled vehicles is particularly adaptable for use in connection with toy wagons or analogous structures, wherein the propelling power is either manual or of relatively low power.

It is, of course, to be understood, that the invention may be constructed in various other manners and the parts associated in different relations, and therefore, I do not desire to be limited in any manner, except as set forth in the claim hereunto appended.

What I claim is:

The combination with a sled having rigidly mounted runners provided with extensions at their rear ends capable of flexing, of a pair of links fixed to the flexing extensions and extending toward each other and pivoted substantially midway between the two runners, a bar connected to said pivoted ends of the links and extending forwardly and terminating in an up-turned part operating in a slot formed in the top of the sled, whereby upon movement of the bar forwardly, the links will pull the flexing extensions of the runners toward each other and thereby exert a braking action on the ground.

In testimony whereof I affix my signature.

SVERRE QUISLING.